US012035377B2

(12) United States Patent
Chen et al.

(10) Patent No.: US 12,035,377 B2
(45) Date of Patent: Jul. 9, 2024

(54) DATA PROCESSING METHOD AND USER EQUIPMENT

(71) Applicant: VIVO MOBILE COMMUNICATION CO., LTD., Chang'an Dongguan (CN)

(72) Inventors: Xiaohang Chen, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 283 days.

(21) Appl. No.: 17/390,376

(22) Filed: Jul. 30, 2021

(65) Prior Publication Data

US 2021/0360709 A1    Nov. 18, 2021

Related U.S. Application Data

(63) Continuation of application No. PCT/CN2019/130099, filed on Dec. 30, 2019.

(30) Foreign Application Priority Data

Jan. 30, 2019  (CN) .......................... 201910094345.0

(51) Int. Cl.
*H04W 74/0833*    (2024.01)
*H04W 74/08*    (2024.01)

(52) U.S. Cl.
CPC ... *H04W 74/0841* (2013.01); *H04W 74/0866* (2013.01)

(58) Field of Classification Search
CPC ....................... H04W 74/0841; H04W 74/0866
See application file for complete search history.

(56) References Cited

U.S. PATENT DOCUMENTS

2010/0179702 A1    7/2010    Guo
2014/0348078 A1    11/2014   Kim et al.
(Continued)

FOREIGN PATENT DOCUMENTS

CN    104618883 A    5/2015
CN    106797305 A    5/2017
(Continued)

OTHER PUBLICATIONS

First Japanese Office Action related to Application No. 2021-544408 reported on Jul. 13, 2022.
(Continued)

*Primary Examiner* — James P Duffy
(74) *Attorney, Agent, or Firm* — von Briesen & Roper, s.c.

(57) ABSTRACT

Embodiments of this application disclose a data processing method and user equipment. The method includes: performing any one of the following based on a relationship between a target time domain gap and a first preset value: sending a random access channel; sending an uplink data channel; sending a random access channel and an uplink data channel; or skipping sending a random access channel and an uplink data channel, where the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

20 Claims, 7 Drawing Sheets

UE obtains a target time domain gap /201

The UE performs any one of the following based on a relationship between the target time domain gap and a first preset value: sending a random access channel; sending an uplink data channel; sending a random access channel and an uplink data channel; or skipping sending a random access channel and an uplink data channel /202

(56) References Cited

U.S. PATENT DOCUMENTS

| | | | |
|---|---|---|---|
| 2015/0181533 A1* | 6/2015 | Chen | H04W 52/50 455/522 |
| 2017/0208590 A1 | 7/2017 | Kim | |
| 2017/0265230 A1 | 9/2017 | Liu | |
| 2018/0213571 A1 | 7/2018 | Wang | |
| 2018/0279186 A1 | 9/2018 | Park | |
| 2019/0215864 A1 | 7/2019 | Yang | |
| 2019/0327686 A1 | 10/2019 | Zhang | |
| 2021/0385872 A1* | 12/2021 | Liu | H04W 74/0841 |
| 2022/0095378 A1* | 3/2022 | Lei | H04W 74/0833 |

FOREIGN PATENT DOCUMENTS

| | | | |
|---|---|---|---|
| CN | 107371273 A | 11/2017 | |
| CN | 108282855 A | 7/2018 | |
| CN | 108293265 A | 7/2018 | |
| CN | 108684076 A | 10/2018 | |
| EP | 2760242 A2 | 7/2014 | |
| JP | 2014518488 A | 7/2014 | |
| WO | 2008101400 A1 | 8/2008 | |

OTHER PUBLICATIONS

Wang, "An Adaptive Algorithm for Uplink Transmission Mode in LTE-A Systems," Wuhan Research Institute of Post and Telecommunications, Sum No. 193, Feb. 2016.

Written Opinion and International Preliminary Report on Patentability dated Mar. 16, 2020, in related application PCT/CN2019/130099 filed Dec. 30, 2019.

Office Action from Chinese Patent Office dated Dec. 3, 2020, in related application 201910094345.0.

R1-1901192—Source: Nokia, Nokia Shanghai Bell "On 2-step Random Access Procedure" Agenda item: 7.2.14, Document for : Discussion, 3GPP TSG RAN WG1 Ad-Hoc Meeting 1901, Taipei, Taiwan, Jan. 21-25, 2019.

Extended European Search Report related to Application No. 19912824.0 reported on Feb. 22, 2022.

* cited by examiner

DATA PROCESSING METHOD AND USER EQUIPMENT

This application is a continuation application of PCT Application No. PCT/CN2019/130099 filed on Dec. 30, 2019, which claims priority to Chinese Patent Application No. 201910094345.0, filed with the China National Intellectual Property Administration on Jan. 30, 2019 and entitled "DATA PROCESSING METHOD AND USER EQUIPMENT", the disclosures of which are incorporated herein by reference in their entireties.

TECHNICAL FIELD

Embodiments of this application relate to the field of communications technologies, and in particular, to a data processing method and user equipment.

BACKGROUND

Generally, when initiating two-step random access, user equipment (UE) can send a message A (msgA, such as a random access request message) to a network device, and completes the two-step random access procedure after receiving a message B (msgB, such as a random access response message) sent by the network device. The UE can have the msgA carried on a physical random access channel (PRACH) and a physical uplink shared channel (PUSCH) to the network device.

However, the UE may need to send the PRACH carrying msgA and the PUSCH carrying msgA on contiguous time domain resources, and the UE may send the PRACH and the PUSCH at different transmit powers. In this case, after sending the PRACH by using one transmit power, the UE first adjusts the power, and then sends the PUSCH by using the adjusted transmit power. As a result, the UE cannot send the PRACH and the PUSCH on contiguous time domain resources, and uplink transmission performance cannot be ensured.

SUMMARY

According to a first aspect of the embodiments of this application, a data processing method is provided, applied to UE, and the data processing method includes: performing any one of the following based on a relationship between a target time domain gap and a first preset value: sending a random access channel; sending an uplink data channel; sending a random access channel and an uplink data channel; or skipping sending a random access channel and an uplink data channel, where the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

According to a second aspect of the embodiments of this application, UE is provided. The UE includes a processing unit, where the processing unit is configured to perform any one of the following based on a relationship between a target time domain gap and a first preset value: sending a random access channel; sending an uplink data channel; sending a random access channel and an uplink data channel; or skipping sending a random access channel and an uplink data channel, where the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

According to a third aspect of the embodiments of this application, UE is provided. The UE includes a processor, a memory, and a computer program stored in the memory and capable of running on the processor, where when the computer program is executed by the processor, steps of the data processing method according to the first aspect are implemented.

According to a fourth aspect of the embodiments of this application, a computer-readable storage medium is provided. The computer-readable storage medium stores a computer program, and when the computer program is executed by a processor, steps of the data processing method according to the first aspect are implemented.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification of the embodiments and the claims of this application, the terms "first", "second", and so on are intended to distinguish between different objects but do not indicate a particular order of the objects. For example, a first resource, a second resource, and the like are used to distinguish different resources, rather than describe a specific sequence of resources.

In the descriptions of the embodiments of this application, "plurality" means two or more, unless otherwise specified. For example, a plurality of elements refers to two or more elements.

The term "and/or" in the specification describes an association relationship for describing associated objects and represents that three relationships may exist. For example, a display panel and/or backlight may represent the following three cases: only the display panel, both the display panel and the backlight, and only the backlight. The symbol "/" herein indicates an "or" relationship of associated objects. For example, input/output means input or output.

In the embodiments of this application, the word such as "exemplary" or "for example" is used to represent giving an example, an instance, or an illustration. Any embodiment or design solution described as "an example" or "for example" in the embodiments of this application shall not be interpreted to be more preferential or advantageous than other embodiments or design solutions. Specifically, the terms such as "an example" or "for example" are intended to present related concepts in a specific manner.

Some concepts and/or terms used in the data processing method and user equipment that are provided in the embodiments of this application are explained below.

Four-step random access (RACH): The UE can first send a message 1 (msg1) to a network device, where the msg1 includes a preamble; after receiving the preamble, a network device can send a message 2 (msg2) to the UE, where the msg2 includes a random access response (RAR) message corresponding to the preamble; after receiving the msg2, the UE can send a message 3 (msg3) to the network device according to an indication in the RAR; after receiving the msg3, the network device can send a message 4 (msg4) to the UE, where the msg4 includes a contention resolution identifier (Contention Resolution ID); and the UE receives the msg4, and the four-step random access procedure ends.

Two-step random access: The UE can send a msgA to the network device; after receiving the msgA, the network device can send a msgB to the UE; and after the UE receives the msgB, the two-step random access procedure ends. The msgA (random access request message) can include a random access preamble (Preamble) and random access information (higher layer information), the random access preamble can be transmitted over a PRACH, and the random access information can be transmitted over a PUSCH.

PRACH occasion (RO): In the new radio (NR) technology, the base station can configure a plurality of random access channel transmission occasions (PRACH transmission occasion) that are frequency division multiplexed (FDM) at one time instance (time instance, that is, duration required for transmitting one PRACH resource, or a time domain resource for transmitting a PRACH herein). The number of ROs that can be FDMed at one time instance can be: $\{1, 2, 4, 8\}$.

The random access preamble can be transmitted only on a time domain resource configured by a parameter PRACH configuration index, or the random access preamble can be transmitted only on a frequency domain resource configured by a parameter PRACH-FDM. A frequency domain resource for the PRACH is $n_{RA} \in \{0, 1, \ldots, M-1\}$, where M is equal to the higher-layer parameter PRACH-FDM. During initial access, the frequency domain resources $n_{RA}$ of the PRACH are numbered in ascending order from an RO resource with a lowest frequency in an initial active uplink bandwidth part; otherwise, the frequency domain resources $n_{RA}$ of the PRACH are numbered in ascending order from an RO resource with a lowest frequency in an active uplink bandwidth part.

In NR, there is an association between ROs and actually transmitted synchronization signal blocks (SSB, such as a synchronization signal (SS) or physical broadcast channel blocks (PBCH block)). One RO may be associated with a plurality of SSBs. The number of SSBs associated with one RO may be: $\{1/8, 1/4, 1/2, 1, 2, 4, 8, 16\}$. For a contention-free random access procedure, ROs may also be in an association with channel state information-reference signals (CSI-RS). At one time instance, the number of FDMed ROs is 8, and the number of actually transmitted SSBs is 4. For example, the corresponding SSBs are SSB #0, SSB #1, SSB #2, and SSB #3, and each SSB is associated with two ROs. If the UE sends a PRACH on an RO corresponding to SSB #0, the UE selects one RO from RO #0 and RO #1 to send the PRACH.

Based on the data processing method and the user equipment provided in the embodiments of this application, the UE can perform any one of the following based on a relationship between a target time domain gap (that is, a gap between a time domain location of a first resource and a time domain location of a second resource, where the first resource is a resource for a random access channel, and the second resource is a resource for an uplink data channel) and a first preset value: sending a random access channel; sending an uplink data channel; sending a random access channel and an uplink data channel; or skipping sending a random access channel and an uplink data channel. Because the target time domain gap is the gap between the time domain location of the first resource and the time domain location of the second resource, based on the relationship between the target time domain gap and the first preset value, the UE can determine whether the target time gap is sufficient for the UE to adjust power, so as to determine whether to send the random access channel and/or the uplink data channel carrying the random access message. This can ensure that the UE has enough time to adjust the power, thereby ensuring uplink transmission performance of the UE in sending contiguous random access channels and uplink data channels.

The data processing method and the user equipment provided in the embodiments of this application may be applied to a communications system. The data processing method and the user equipment can be specifically applied to procedures in which the UE determines how to process a random access message based on a gap between time domain locations of two resources (resources for two channels carrying the random access message) in the communications system.

Figure 1:
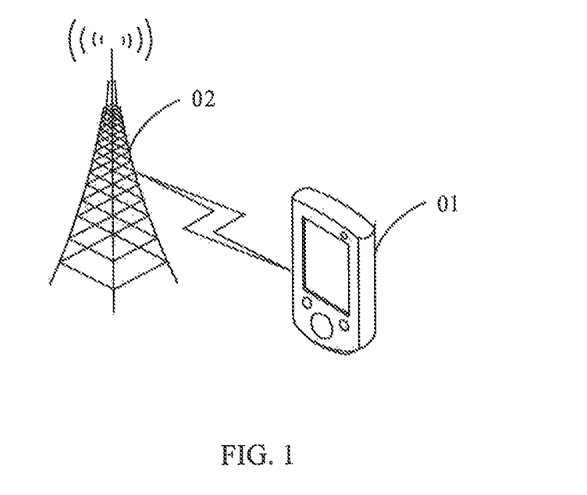
FIG. 1 is a schematic diagram of an architecture of a communications system according to an embodiment of this application.

FIG. 1 is a schematic diagram of an architecture of a communications system according to an embodiment of this application. As shown in FIG. 1, the communications system may include UE 01 and a network device 02. The UE 01 can establish a connection to and communicate with the network device 02.

It should be noted that in this embodiment of this application, the connection between the UE 01 and the network device 02 shown in FIG. 1 may be wireless. To illustrate a connection relationship between the UE 01 and the network device 02 more clearly, a solid line is used in FIG. 1 to indicate the connection relationship between the UE 01 and the network device 02.

The UE may be a device that provides a user with voice and/or data connectivity, a handheld device with a wired/wireless connection function, or other processing devices connected to a wireless modem. The UE can communicate with one or more core network devices through a radio access network (RAN). The UE may be a mobile terminal, such as a mobile phone (or referred to as a "cellular" phone) and a computer with a mobile terminal, or may be a portable, pocket-sized, handheld, computer built-in or vehicle-mounted mobile apparatus, which exchanges voice and/or data with the RAN. For example, the UE is a device such as a personal communication service (PCS) phone, a cordless telephone set, a session initiation protocol (SIP) phone, a wireless local loop (WLL) station, or a personal digital assistant (PDA). The UE may also be referred to as a user agent, a terminal device, or the like.

The network device may be a base station. The base station is an apparatus deployed in a RAN and configured to provide a wireless communication function for the UE. The base station may include various forms of macro base stations, micro base stations, relay nodes, access points, and the like. In systems using different radio access technologies, a device with a base station function may have different names. For example, in a third generation mobile communication (3rd-Generation, 3G) network, it is referred to as a NodeB; in an LTE system, it is referred to as an evolved NodeB (eNB or eNodeB); in a 5th generation mobile communication (5G) network, it is referred to as a gNB, and so on. With evolution of communications technologies, the name "base station" may change.

An embodiment of this application provides a data processing method, and the data processing method can be implemented in the following possible manners.

In a possible implementation, in a case that a time domain location of a second resource is behind at least N time units (also referred to as at least N time domain units) behind a time domain location of a first resource, the UE sends a random access channel and an uplink data channel.

It can be understood that, in this implementation, a time gap between the time domain location of the second resource and the time domain location of the first resource (that is, the target time domain gap in this embodiment of this application) is the at least N time units.

The first resource is a resource for the random access channel, the second resource is a resource for the uplink data channel, and the random access channel and the uplink data channel are used to carry a random access message.

Specifically, the UE may send the uplink data channel after at least N time units following sending of the random access channel.

In another possible implementation, in a case that the time gap between the time domain location of the second resource and the time domain location of the first resource (that is, the target time domain gap in this embodiment of this application) is less than N time units, the UE only sends the random access channel;
the UE only sends the uplink data channel;
the UE skips sending the random access channel and the uplink data channel;
the UE sends the random access channel and the uplink data channel by using the same transmit power; or
the UE sends the random access channel and the uplink data channel, and the UE does not add an uplink payload in the first X time units in the uplink data channel (that is, a first time domain unit in this embodiment of this application, also referred to as first X time domain units).

In another possible implementation, when the UE sends the random access channel and the uplink data channel by using same transmit power, the UE can send the random access channel and the uplink data channel by using transmit power for the random access channel, or the UE can send the random access channel and the uplink data channel by using transmit power for the uplink data channel.

Optionally, in this embodiment of this application, a value of N may be predefined or configured by the network device. A value of X may be predefined or configured by the network device.

The first resource, the second resource, the random access channel, the uplink data channel, the random access message, and the like are described in detail in the following embodiments. Details are not described herein.

The following specifically describes the data processing method and the user equipment provided in the embodiments of this application through specific embodiments and application scenarios thereof with reference to the accompanying drawings.

Figure 2:
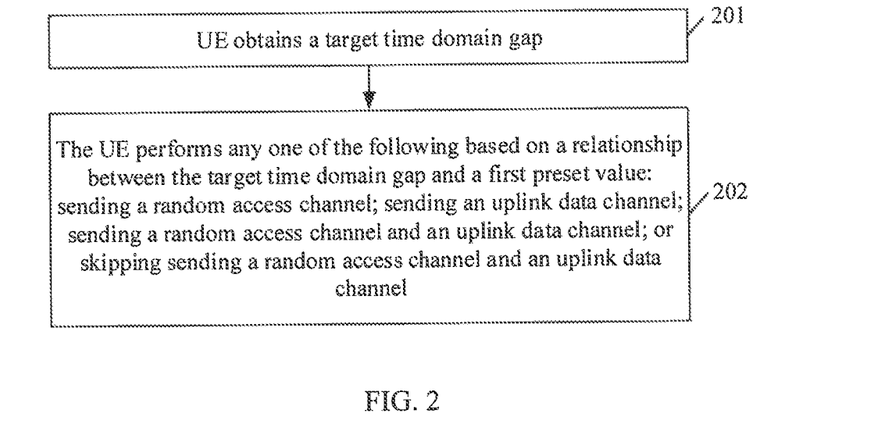
FIG. 2 is a first schematic diagram of a data processing method according to an embodiment of this application.

Based on the communications system shown in FIG. 1, an embodiment of this application provides a data processing method. As shown in FIG. 2, the data processing method may include the following step 201 and step 202.

Step 201: UE obtains a target time domain gap.

In this embodiment of this application, the target time domain gap is a gap between a time domain location of a first resource and a time domain location of a second resource, the first resource is a resource for a random access channel, the second resource is a resource for an uplink data channel, and the random access channel and the uplink data channel are used to carry a random access message.

Optionally, in this embodiment of this application, the resource for the random access channel may be a transmission occasion of the random access channel, and the resource for the uplink data channel may be a transmission occasion of the uplink data channel.

It should be noted that in this embodiment of this application, the resource for the random access channel and the resource for the uplink data channel are both effective resources; and the transmission occasion of the random access channel and the transmission occasion of the uplink data channel are both effective transmission occasions. The transmission occasion of the random access channel (or uplink data channel) is effective, which means that a time domain resource in which the transmission occasion of the random access channel (or uplink data channel) configured by a network device is located does not conflict with a downlink (DL) resource or a DL transmission occasion.

Optionally, in this embodiment of this application, the resource for the random access channel and the resource for the uplink data channel may have an association relationship. The association relationship between the resource for the random access channel and the resource for the uplink data channel may be a one-to-one association relationship (that is, one resource for the random access channel is associated with one resource for the uplink data channel), or may be a one-to-many association relationship (that is, one resource for the random access channel is associated with a plurality of resources for the uplink data channel), or may be a many-to-one association relationship (that is, a plurality of resources for the random access channel are associated with one resource for the uplink data channel), or may be a many-to-many association relationship (that is, a plurality of resources for the random access channel are associated with a plurality of resources for the uplink data channel).

Optionally, in this embodiment of this application, the time domain location of the first resource may be an end location of the first resource, and the time domain location of the second resource may be a start location of the second resource.

Optionally, in this embodiment of this application, the random access message may include a random access preamble and random access information (higher layer information), the random access channel is used to carry the random access preamble, and the uplink data channel is used to carry the random access information.

Optionally, in this embodiment of this application, the random access message may be a random access message corresponding to two-step random access.

Optionally, in this embodiment of this application, the first resource may include a time domain resource for the random access channel, or a time domain resource and a frequency domain resource for the random access channel; and the second resource may include a time domain resource for the uplink data channel, or a time domain resource and a frequency domain resource for the uplink data channel.

Optionally, in this embodiment of this application, the random access channel may be a PRACH and the uplink data channel may be a PUSCH.

It may be understood that the time domain location of the second resource is behind the time domain location of the first resource.

Figure 3:
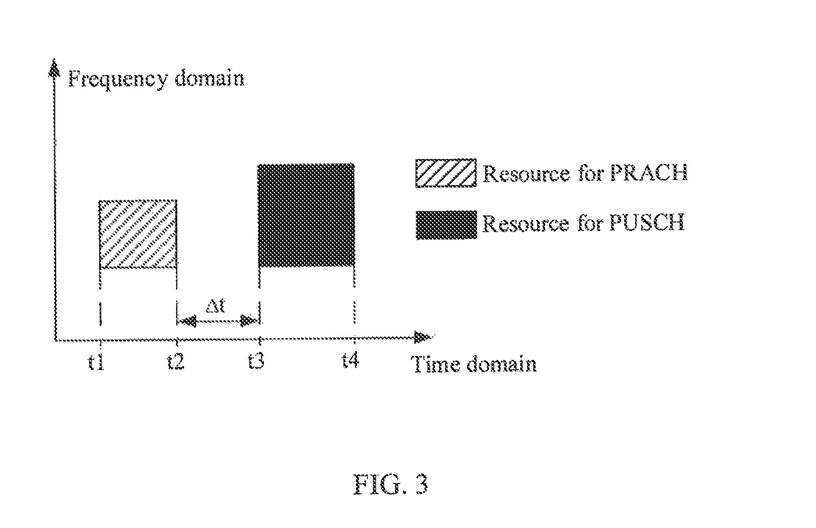
FIG. 3 is a first schematic diagram of an instance of a PRACH resource and a PUSCH resource according to an embodiment of this application.

For example, as shown in FIG. 3, time domain locations of a resource for a PRACH are t1 and t2 (t2>t1), and time domain locations of a resource for a PUSCH are t3 and t4 (t4>t3≥t2, which means the time domain location of the resource for the PUSCH is behind the time domain location of the resource for the PRACH; in FIG. 3, t3>t2 is used for description), the UE can determine a gap between an end location of the resource for the PRACH (that is, t2) and a start location (that is, t3) of the resource for the PUSCH as the target time domain gap Δt. That is, the target time domain gap Δt is t3−t2.

Step 202: The UE performs any one of the following based on a relationship between a target time domain gap and a first preset value: sending a random access channel; sending an uplink data channel; sending a random access channel and an uplink data channel; or skipping sending a random access channel and an uplink data channel.

In this embodiment of this application, the UE may compare the target time domain gap with the first preset value to determine a relationship between the target time domain gap and the first preset value, that is, to determine a value relationship between the target time domain gap and the first preset value.

Optionally, in this embodiment of this application, the first preset value may be predefined or configured by the network device.

It should be noted that the skipping sending a random access channel and an uplink data channel may be understood as: quitting sending the random access channel on the first resource and quitting sending the uplink data channel on the second resource.

Figure 4:
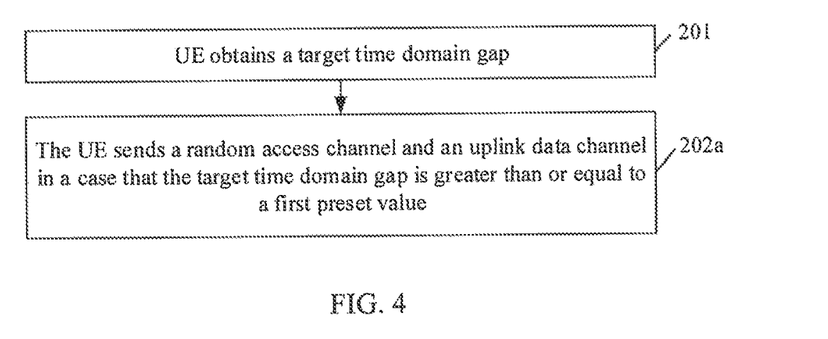
FIG. 4 is a second schematic diagram of a data processing method according to an embodiment of this application.

Optionally, in this embodiment of this application, with reference to FIG. 2, as shown in FIG. 4, the foregoing step 202 may be specifically implemented through the following step 202a.

Step 202a: The UE sends the random access channel and the uplink data channel in a case that the target time domain gap is greater than or equal to the first preset value.

In this embodiment of this application, in a case that the target time domain gap is greater than or equal to the first preset value, the UE may send the random access channel at the time domain location of the first resource, and send the uplink data channel at the time domain location of the second resource.

Optionally, in this embodiment of this application, in a case that the target time domain gap is greater than or equal to the first preset value, the UE may send the random access channel on the first resource by using transmit power for the random access channel (that is, first transmit power below), and send the uplink data channel on the second resource by using transmit power for the uplink data channel (that is, second transmit power below).

For example, with reference to FIG. 3, if the target time domain gap Δt (t3−t2) is greater than or equal to the first preset value, the UE may send the PRACH on the resource for the PRACH and send the PUSCH on the resource for the PUSCH.

In this embodiment of this application, when the target time domain gap is greater than or equal to the first preset value, the UE has enough time to adjust power (that is, after the UE sends the random access channel, the UE has enough time to switch from the transmit power for the random access channel to the transmit power for the uplink data channel), so that the UE can send the random access channel and the uplink data channel, thereby ensuring uplink transmission performance of the UE in sending the random access channel and the uplink data channel.

Figure 5:
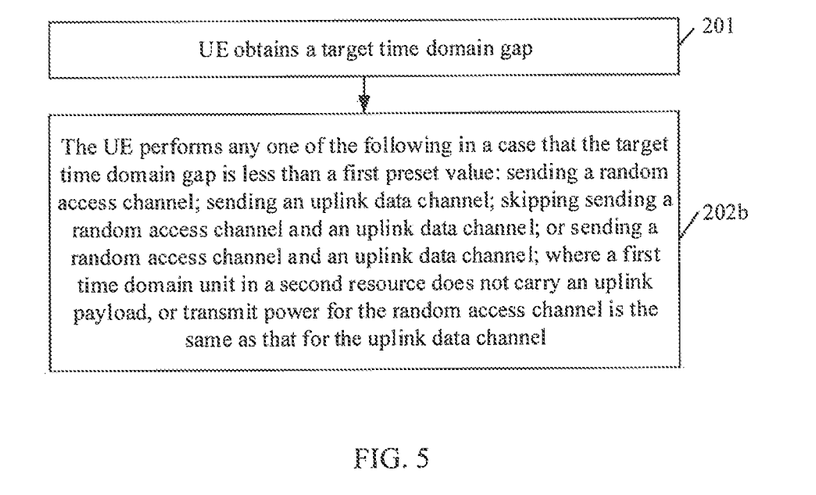
FIG. 5 is a third schematic diagram of a data processing method according to an embodiment of this application.

Optionally, in this embodiment of this application, with reference to FIG. 2, as shown in FIG. 5, step 202 may be specifically implemented through the following step 202b.

Step 202b: The UE performs any one of the following in a case that the target time domain gap is less than the first preset value: sending the random access channel; sending the uplink data channel; skipping sending the random access channel and the uplink data channel; or sending the random access channel and the uplink data channel, where a first time domain unit in the second resource does not carry an uplink payload, or transmit power for the random access channel is the same as that for the uplink data channel.

Optionally, in this embodiment of this application, in a case that the target time domain gap is less than the first preset value, the UE may send the random access channel on the first resource.

Optionally, in this embodiment of this application, in a case that the target time domain gap is less than the first preset value, the UE may send the random access channel on the first resource by using the transmit power for the random access channel.

Optionally, in this embodiment of this application, in a case that the target time domain gap is less than the first preset value, the UE may send the uplink data channel on the second resource.

Optionally, in this embodiment of this application, in a case that the target time domain gap is less than the first preset value, the UE may send the uplink data channel on the second resource by using the transmit power for the uplink data channel.

Optionally, in this embodiment of this application, in a case that the target time domain gap is less than the first preset value, the UE may send the random access channel on the first resource, and send the uplink data channel on a time domain resource in the second resource other than the first time domain unit.

Optionally, in this embodiment of this application, the first time domain unit may be predefined or configured by a network device.

Optionally, in this embodiment of this application, the first time domain unit may be X time domain units starting from a first time domain location in the second resource, a value of X is predefined or configured by a network device, and the first time domain location is a start location of the second resource.

Optionally, in this embodiment of this application, a sum of the target time domain gap and the first time domain unit is greater than or equal to the first preset value.

Figure 6:
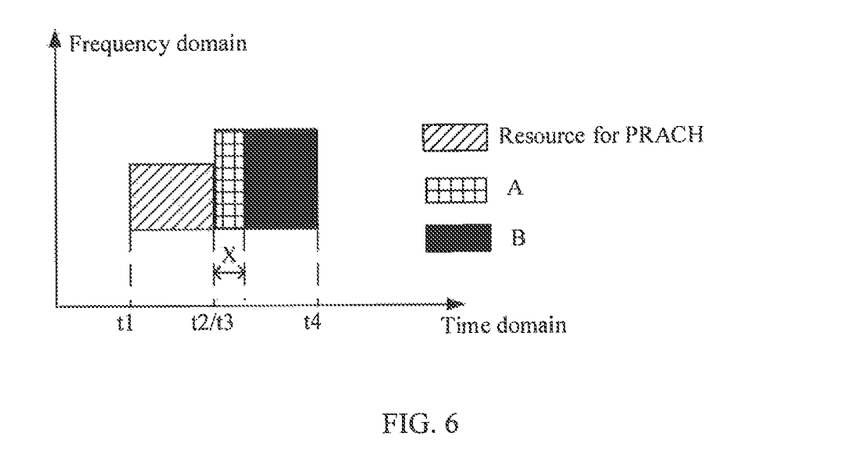
FIG. 6 is a second schematic diagram of an instance of a PRACH resource and a PUSCH resource according to an embodiment of this application.

For example, with reference to FIG. 3, as shown in FIG. 6, it is assumed that t3=t2, that is, the target time domain gap Δt is 0. A first time domain unit A is X time domain units starting from a start location (that is, t3) of the resource for the PUSCH, and the UE may send the uplink data channel on a time domain resource in the resource for the PUSCH other than the first time domain unit (for example, a time domain resource in shadow part B in FIG. 6, where the shadow part B represents a time domain unit that can carry PUSCH transmission in the resource for the PUSCH).

Optionally, in this embodiment of this application, the first time domain unit carries an extended cyclic prefix (CP), for example, a cyclic prefix for a second time domain unit. The second time domain unit is a time domain unit next to the first time domain unit in the second resource.

Optionally, in this embodiment of this application, in a case that the target time domain gap is less than the first preset value, the UE may send the random access channel and the uplink data channel by using the same transmit power.

In this embodiment of this application, when the target time domain gap is less than the first preset value, the UE can send only the random access channel or the uplink data channel, so that the UE does not need to adjust power (that is, after sending the random access channel or before sending the uplink data channel, the UE does not need to switch from the transmit power for the random access channel to the transmit power for the uplink data channel), thereby ensuring uplink transmission performance of the UE in sending the random access channel or the uplink data channel.

In this embodiment of this application, when the target time domain gap is less than the first preset value, the UE can send the random access channel and the uplink data channel, and the first time domain unit in the second resource is not used to send the PUSCH, so that the UE has enough time to adjust the power between sending of the random access channel and sending of the uplink data channel (that is, after sending the random access channel, the UE may adjust the power within the target time domain gap and the first time domain unit), thereby ensuring uplink transmission performance of the UE in sending the random access channel and the uplink data channel.

In this embodiment of this application, when the target time domain gap is less than the first preset value, the UE can send the random access channel and the uplink data channel, and transmit power for the random access channel is the same as that for the uplink data channel, so that the UE does not need to adjust the power between sending of the random access channel and sending of the uplink data channel (that is, after sending the random access channel, the UE does not need to switch from the transmit power for the random access channel to the transmit power for the uplink data channel), thereby ensuring uplink transmission performance of the UE in sending the random access channel and the uplink data channel.

According to the data processing method provided in this embodiment of this application, the UE can perform any one of the following based on a relationship between a target time domain gap (that is, a gap between a time domain location of a first resource and a time domain location of a second resource, where the first resource is a resource for a random access channel, and the second resource is a resource for an uplink data channel) and a first preset value: sending a random access channel; sending an uplink data channel; sending a random access channel and an uplink data channel; or skipping sending a random access channel and an uplink data channel. Because the target time domain gap is the gap between the time domain location of the first resource and the time domain location of the second resource, based on the relationship between the target gap and the first preset value, the UE can determine whether the target time gap is sufficient for the UE to adjust power, so as to determine whether to send the random access channel and/or the uplink data channel carrying the random access message. This can ensure that the UE has enough time to adjust the power, thereby ensuring uplink transmission performance of the UE in sending contiguous random access channels and uplink data channels.

Figure 7:
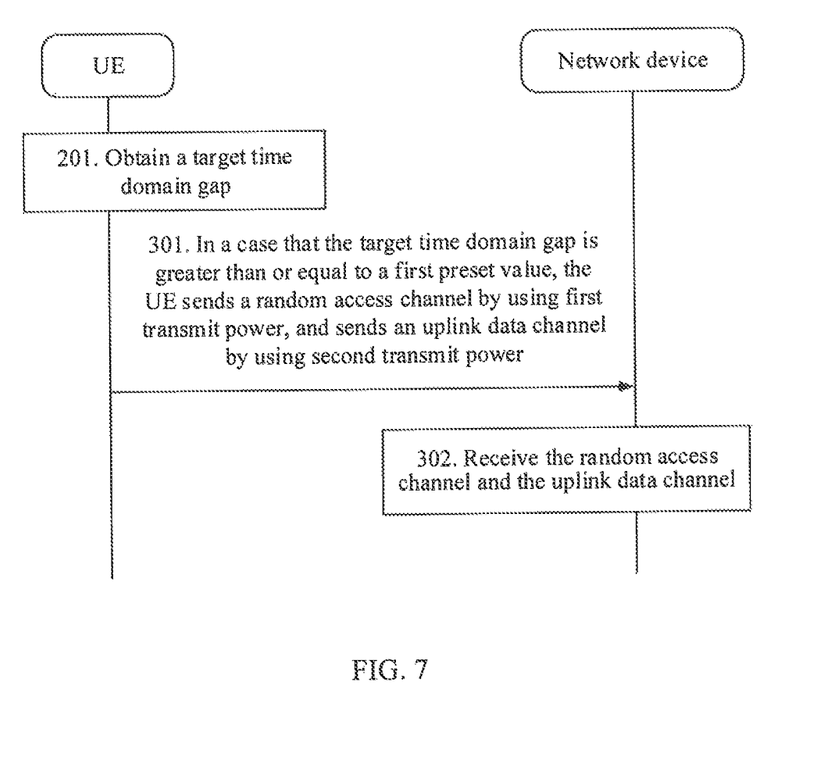
FIG. 7 is a fourth schematic diagram of a data processing method according to an embodiment of this application.

Optionally, in this embodiment of this application, with reference to FIG. 4, as shown in FIG. 7, step 202a may be specifically implemented through the following step 301 to step 302.

Step 301: In a case that the target time domain gap is greater than or equal to the first preset value, the UE sends a random access channel by using first transmit power, and sends an uplink data channel by using second transmit power.

It may be understood that the UE can send the random access channel to the network device by using the first transmit power, switch from the first transmit power to the second transmit power within the target time gap, and then send the uplink data channel to the network device by using the second transmit power.

Step 302: The network device receives the random access channel and the uplink data channel from the UE.

In this embodiment of this application, when the target time domain gap is greater than or equal to the first preset value, the UE has enough time to adjust power (that is, after the UE sends the random access channel, the UE has enough time to switch from the transmit power for the random access channel to the transmit power for the uplink data channel). This ensures that the UE has enough time to adjust power when sending the random access channel and the uplink data channel, thereby ensuring uplink transmission performance of the UE.

Figure 8:
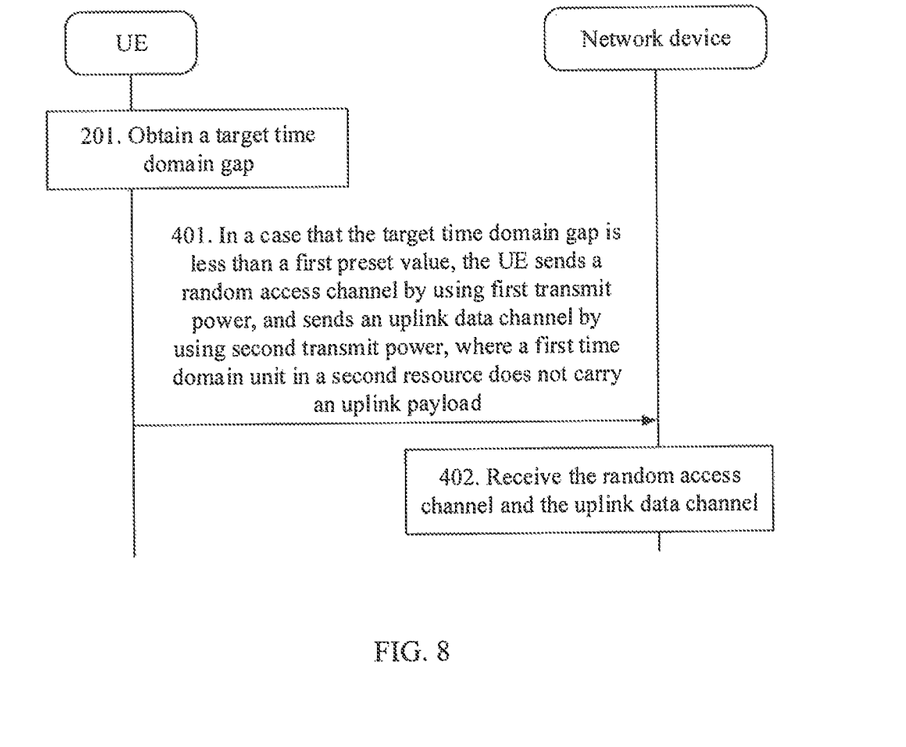
FIG. 8 is a fifth schematic diagram of a data processing method according to an embodiment of this application.

Optionally, in this embodiment of this application, with reference to FIG. 5, in a case that step 202b is "the UE sends the random access channel and the uplink data channel in a case that the target time domain gap is less than the first preset value, where a first time domain unit in the second resource does not carry an uplink payload", as shown in FIG. 8, step 202b may be specifically implemented through the following step 401 and step 402.

Step 401: In a case that the target time domain gap is less than the first preset value, the UE sends a random access channel by using first transmit power, and sends an uplink data channel by using second transmit power, where a first time domain unit in the second resource does not carry an uplink payload.

It may be understood that the UE can send the random access channel to the network device by using the first transmit power, switch from the first transmit power to the second transmit power within the target time gap and a first time domain unit, and then send the uplink data channel to the network device by using the second transmit power.

Step 402: The network device receives the random access channel and the uplink data channel from the UE.

In this embodiment of this application, when the target time domain gap is less than the first preset value, the UE can send the random access channel and the uplink data channel, and the first time domain unit in the second resource does not carry the uplink payload, so that the UE has enough time to adjust the power (that is, after sending the random access channel, the UE may adjust the power within the target time domain gap and the first time domain unit). This can ensure that the UE has enough time to adjust power when sending the random access channel and the uplink data channel, thereby ensuring uplink transmission performance of the UE.

Figure 9:
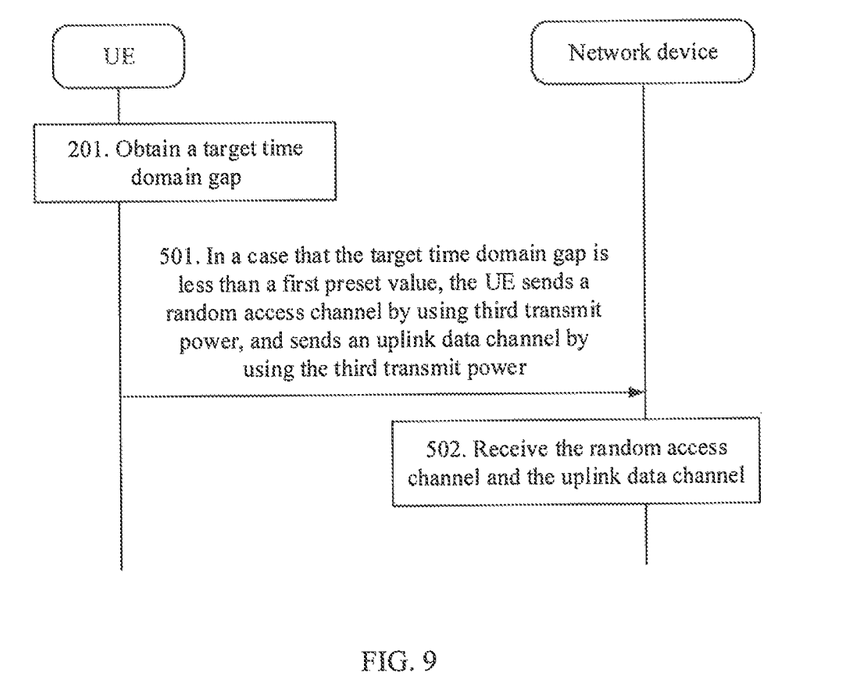
FIG. 9 is a sixth schematic diagram of a data processing method according to an embodiment of this application.

Optionally, in this embodiment of this application, with reference to FIG. 5, in a case that step 202b is "the UE sends the random access channel and the uplink data channel in a case that the target time domain gap is less than the first preset value, where the transmit power for the random access channel is the same as that for the uplink data channel", as shown in FIG. 9, step 202b may be specifically implemented through the following step 501 and step 502.

Step 501: In a case that the target time domain gap is less than the first preset value, the UE sends a random access channel by using third transmit power, and sends an uplink data channel by using the third transmit power.

In this embodiment of this application, the third transmit power is the transmit power for the random access channel or the transmit power for the uplink data channel.

Step 502: The network device receives the random access channel and the uplink data channel from the UE.

In this embodiment of this application, when the target time domain gap is less than the first preset value, the UE can send the random access channel and the uplink data channel by using the third transmit power, so that the UE does not need to adjust the power between sending of the random access channel and sending of the uplink data channel, thereby ensuring uplink transmission performance of the UE in sending the random access channel and the uplink data channel.

Optionally, in this embodiment of this application, in a case that step 202b is "the UE sends the random access channel in a case that the target time domain gap is less than the first preset value", step 202b may be specifically implemented through the following step 601 and step 602.

Step 601: In a case that the target time domain gap is less than the first preset value, the UE sends a random access channel by using first transmit power.

Step 602: The network device receives the random access channel sent by the UE.

In this embodiment of this application, when the target time domain gap is less than the first preset value, the UE can send only the random access channel by using the first transmit power, and therefore, so that the UE does not need to adjust the power, thereby ensuring uplink transmission performance of the UE in sending the random access channel.

Optionally, in this embodiment of this application, in a case that step 202b is "the UE sends the uplink data channel in a case that the target time domain gap is less than the first preset value", step 202b may be specifically implemented through the following step 701 and step 702.

Step 701: In a case that the target time domain gap is less than a first preset value, the UE sends an uplink data channel by using second transmit power.

Step 702: The network device receives the uplink data channel sent by the UE.

In this embodiment of this application, when the target time domain gap is less than the first preset value, the UE can send only the uplink data channel by using the second transmit power, so that the UE does not need to adjust the power, thereby ensuring uplink transmission performance of the UE in sending the uplink data channel.

Figure 10:
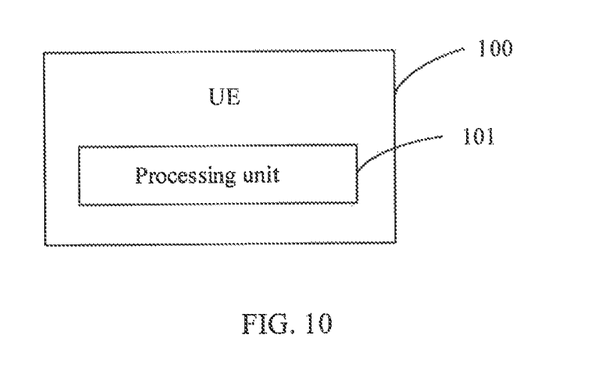
FIG. 10 is a schematic structural diagram of UE according to an embodiment of this application.

FIG. 10 is a possible schematic structural diagram of UE according to an embodiment of this application. As shown in FIG. 10, UE 100 provided in this embodiment of this application may include: a processing unit 101.

The processing unit 101 is configured to perform any one of the following based on a relationship between a target time domain gap and a first preset value: sending a random access channel; sending an uplink data channel; sending a random access channel and an uplink data channel; or skipping sending a random access channel and an uplink data channel, where the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

In a possible implementation, the processing unit 101 is specifically configured to send the random access channel and the uplink data channel in a case that the target time domain gap is greater than or equal to the first preset value.

In a possible implementation, the processing unit 101 is specifically configured to send the random access channel by using first transmit power, and send the uplink data channel by using second transmit power.

In a possible implementation, the processing unit 101 is specifically configured to perform any one of the following in a case that the target time domain gap is less than the first preset value: sending the random access channel; sending the uplink data channel; skipping sending the random access channel and the uplink data channel; or sending the random access channel and the uplink data channel, where a first time domain unit in the second resource does not carry an uplink payload, or transmit power for the random access channel is the same as that for the uplink data channel.

In a possible implementation, the first time domain unit in the second resource does not carry the uplink payload, and the processing unit 101 is specifically configured to send the random access channel by using first transmit power, and send the uplink data channel by using second transmit power.

In a possible implementation, transmit power for the random access channel is the same as that for the uplink data channel, and the processing unit 101 is specifically configured to send the random access channel by using third transmit power, and send the uplink data channel by using the third transmit power, where the third transmit power may be the transmit power for the random access channel or the transmit power for the uplink data channel.

In a possible implementation, the first preset value may be predefined or configured by a network device.

In a possible implementation, the first time domain unit may be predefined or configured by a network device.

In a possible implementation, the first time domain unit may be X time domain units starting from a first time domain location in the second resource, a value of X is predefined or configured by a network device, and the first time domain location is a start location of the second resource.

In a possible implementation, the first time domain unit carries a cyclic prefix CP for a second time domain unit, and the second time domain unit is located in a time domain unit next to the first time domain unit in the second resource.

In a possible implementation, the time domain location of the first resource may be an end location of the first resource, and the time domain location of the second resource may be a start location of the second resource.

The UE provided in this embodiment of this application can implement each process implemented by the UE in the foregoing method embodiment. To avoid repetition, details are not described herein again.

According to the UE provided in this embodiment of this application, because the target time domain gap is the gap between the time domain location of the first resource and the time domain location of the second resource, based on the relationship between the target gap and the first preset value, the UE can determine whether the target time gap is sufficient for the UE to adjust power, so as to determine whether to send the random access channel and/or the uplink data channel carrying the random access message. This can ensure that the UE has enough time to adjust the power, thereby ensuring uplink transmission performance of the UE in sending contiguous random access channels and uplink data channels.

Figure 11:
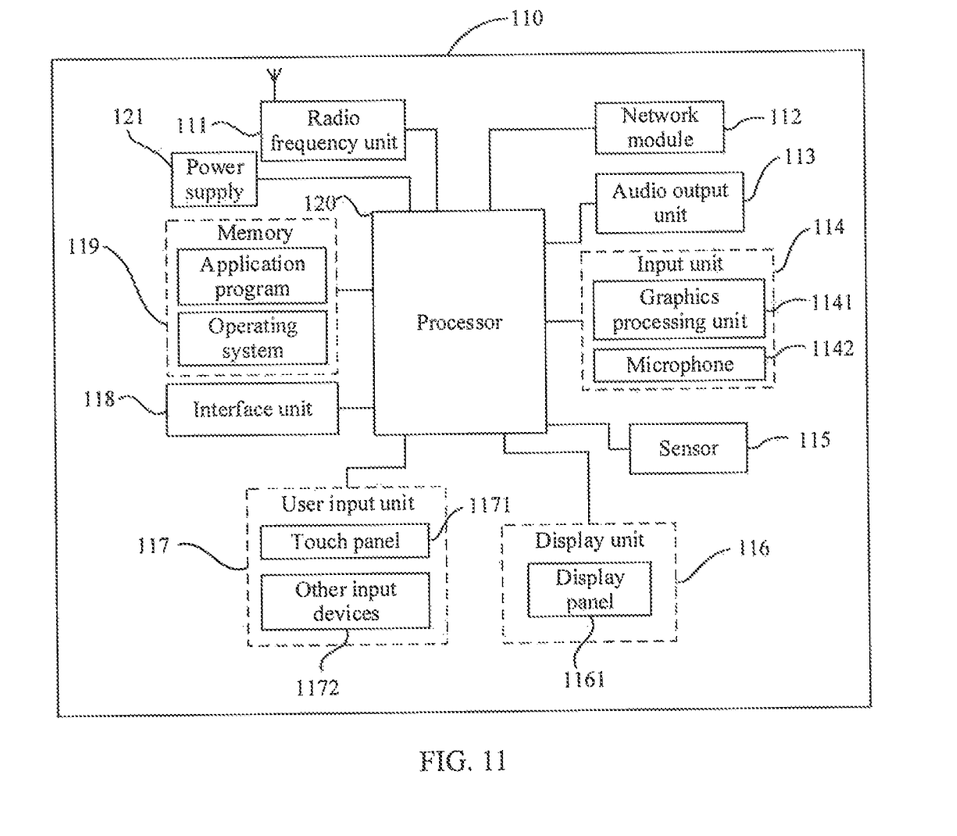
FIG. 11 is a schematic diagram of hardware of UE according to an embodiment of this application.

FIG. 11 is a schematic diagram of hardware of UE according to an embodiment of this application. As shown in FIG. 11, the UE 110 includes but is not limited to a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that the structure of the UE shown in FIG. 11 does not constitute a limitation on the UE. The UE may include more or fewer components than those shown in FIG. 11, or some components may be combined, or the components may be disposed in different manners. For example, in this embodiment of this application, the UE includes but is not limited to a mobile phone, a tablet computer, a notebook computer, a palmtop computer, an in-vehicle terminal, a wearable device, a pedometer, or the like.

The processor 120 may be configured to perform any one of the following based on a relationship between a target time domain gap and a first preset value: sending a random access channel; sending an uplink data channel; sending a random access channel and an uplink data channel; or skipping sending a random access channel and an uplink data channel, where the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

According to the UE provided in this embodiment of this application, because the target time domain gap is the gap between the time domain location of the first resource and the time domain location of the second resource, based on the relationship between the target gap and the first preset value, the UE can determine whether the target time gap is sufficient for the UE to adjust power, so as to determine whether to send the random access channel and/or the uplink data channel carrying the random access message. This can ensure that the UE has enough time to adjust the power, thereby ensuring uplink transmission performance of the UE in sending contiguous random access channels and uplink data channels.

It should be understood that in this embodiment of this application, the radio frequency unit 111 may be configured to: receive and send signals in an information receiving/sending process or a call process; and specifically, after receiving downlink data from a base station, send the downlink data to the processor 120 for processing, and send uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The UE provides wireless broadband Internet access for a user by using the network module 112, for example, helps the user send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal reception sound or a message reception sound) related to a specific function performed by the UE 110. The audio output unit 113 includes a speaker, a buzzer, a telephone receiver, and the like.

The input unit 114 is configured to receive an audio or video signal. The input unit 114 may include a graphics processing unit (GPU) 1141 and a microphone 1142, and the graphics processing unit 1141 processes image data of a still picture or a video obtained by an image capture apparatus (for example, a camera) in an image capture mode or a video capture mode. A processed image frame may be displayed on the display unit 116. An image frame processed by the graphics processing unit 1141 may be stored in the memory 119 (or another storage medium) or sent by the radio frequency unit 111 or the network module 112. The microphone 1142 can receive a sound and can process the sound into audio data. The processed audio data can be converted, for outputting, into a format that can be sent to a mobile communication base station through the radio frequency unit 111 in a telephone call mode.

The UE 110 further includes at least one sensor 115, for example, an optical sensor, a motion sensor, and another sensor. Specifically, the optical sensor includes an ambient light sensor and a proximity sensor, where the ambient light sensor can adjust luminance of a display panel 1161 based on brightness of ambient light, and the proximity sensor can turn off the display panel 1161 and/or backlight when the UE 110 is moved to an ear. As a type of motion sensor, an accelerometer sensor can detect magnitudes of accelerations in all directions (usually three axes), can detect a magnitude and a direction of gravity when the mobile phone is in a static state, and can be applied to UE posture recognition (such as screen switching between portrait and landscape, related games, and magnetometer posture calibration), functions related to vibration recognition (such as pedometer and tapping), and the like. The sensor 115 may also include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided for the user. The display unit 116 may include the display panel 1161. The display panel 1161 may be configured in a form of a liquid crystal display (LCD), an organic light-emitting diode (OLED), or the like.

The user input unit 117 may be configured to receive input digit or character information and generate key signal input related to user setting and function control of the UE. Specifically, the user input unit 117 includes a touch panel 1171 and other input devices 1172. The touch panel 1171, also referred to as a touchscreen, may capture a touch operation performed by a user on or near the touch panel (for example, an operation performed by the user on the touch panel 1171 or near the touch panel 1171 by using any appropriate object or accessory such as a finger or a stylus). The touch panel 1171 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 120, and receives and executes a command sent by the processor 120. In addition, the touch panel 1171 may be implemented in a plurality of forms, for example, as a resistive, capacitive, infrared, or surface acoustic wave touch panel. The user input unit 117 may further include other input devices 1172 in addition to the touch panel 1171. Specifically, the other input devices 1172 may include but are not limited to a physical keyboard, a function key (such as a volume control key or a power on/off key), a trackball, a mouse, a joystick, and the like. Details are not described herein.

Further, the touch panel 1171 may cover the display panel 1161. After detecting a touch operation on or near the touch panel 1171, the touch panel 1171 transmits the touch operation to the processor 120 to determine a type of a touch event. Then the processor 120 provides corresponding visual output on the display panel 1161 based on the type of the touch event. Although in FIG. 11, the touch panel 1171 and the display panel 1161 act as two separate parts to implement input and output functions of the UE, in some embodiments, the touch panel 1171 and the display panel 1161 may be integrated to implement the input and output functions of the UE. This is not specifically limited herein.

The interface unit 118 is an interface connecting an external apparatus to the UE 110. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 118 may be configured to receive input (for example, data information and power) from the external apparatus, and transmit the received input to one or more elements of the UE 110, or may be configured to transmit data between the UE 110 and the external apparatus.

The memory 119 may be configured to store a software program and various data. The memory 119 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 119 may include a high-speed random access memory, or may include a non-volatile memory, for example, at least one magnetic disk storage device, a flash memory device, or other volatile solid-state storage devices.

The processor 120 is a control center of the UE, and is connected to all components of the UE by using various interfaces and lines. By running or executing a software program and/or module that is stored in the memory 119 and calling data stored in the memory 119, the processor 120 executes various functions of the UE and processes data, so as to perform overall monitoring on the UE. The processor 120 may include one or more processing units. Optionally, the processor 120 may integrate an application processor and a modem processor. The application processor mainly processes an operating system, a user interface, an application program, and the like. The modem processor mainly processes wireless communication. It may be understood that the modem processor may alternatively not be integrated into the processor 120.

The UE 110 may further include a power supply 121 (for example, a battery) that supplies power to each component. Optionally, the power supply 121 may be logically connected to the processor 120 by using a power management system, so as to implement functions such as charging management, discharging management, and power consumption management by using the power management system.

In addition, the UE 110 includes some function modules that are not shown, details of which are not described herein.

Optionally, an embodiment of this application further provides UE, including a processor 120, a memory 119, and a computer program stored in the memory 119 and capable of running on the processor 120 that are shown in FIG. 11. When the computer program is executed by the processor 120, processes of the foregoing method embodiments can be implemented and a same technical effect can be achieved. To avoid repetition, details are not described herein again.

An embodiment of this application further provides a computer-readable storage medium, where the computer-readable storage medium stores a computer program. When the computer program is executed by the processor 120 shown in FIG. 11, the processes of the foregoing embodiments of the prompting method are implemented, with the same technical effects achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementations. The foregoing implementations are only illustrative rather than restrictive. Inspired by this application, persons of ordinary skill in the art can still derive many variations without departing from the essence of this application and the protection scope of the claims. All these variations shall fall within the protection of this application.

What is claimed is:

1. A data processing method, applied to user equipment (UE), comprising:
   determining, based on a relationship between a target time domain gap and a first preset value, to perform one of the following:
   sending a random access channel; sending an uplink data channel; sending a random access channel and an uplink data channel; or skipping sending a random access channel and an uplink data channel, wherein
   the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

2. The method according to claim 1, wherein the determining, based on the relationship between the target time domain gap and the first preset value, to perform one of the following: sending a random access channel; sending an uplink data channel; sending a random access channel and an uplink data channel; or skipping sending a random access channel and an uplink data channel, comprises:
   sending the random access channel and the uplink data channel in a case that the target time domain gap is greater than or equal to the first preset value.

3. The method according to claim 2, wherein the sending the random access channel and the uplink data channel comprises:
   sending the random access channel by using first transmit power, and sending the uplink data channel by using second transmit power.

4. The method according to claim 1, wherein the determining, based on the relationship between the target time domain gap and the first preset value, to perform one of the following: sending a random access channel; sending an uplink data channel; sending a random access channel and an uplink data channel; or skipping sending a random access channel and an uplink data channel, comprises:
   performing any one of the following in a case that the target time domain gap is less than the first preset value:
   sending the random access channel;
   sending the uplink data channel;
   skipping sending the random access channel and the uplink data channel; or
   sending the random access channel and the uplink data channel; wherein a first time domain unit in the second resource does not carry an uplink payload, or transmit power for the random access channel is the same as that for the uplink data channel.

5. The method according to claim 4, wherein the first time domain unit in the second resource does not carry the uplink payload; and
   the sending the random access channel and the uplink data channel comprises:
   sending the random access channel by using first transmit power, and sending the uplink data channel by using second transmit power.

6. The method according to claim 4, wherein the transmit power for the random access channel is the same as that for the uplink data channel; and
   the sending the random access channel and the uplink data channel comprises:
   sending the random access channel by using third transmit power, and sending the uplink data channel by using the third transmit power, wherein the third transmit power is the transmit power for the random access channel or the transmit power for the uplink data channel.

7. The method according to claim 4, wherein the first time domain unit is X time domain units starting from a first time domain location in the second resource, a value of X is predefined or configured by a network device, and the first time domain location is a start location of the second resource.

8. The method according to claim 4, wherein the first time domain unit carries a cyclic prefix (CP) for a second time domain unit, and the second time domain unit is located in a time domain unit next to the first time domain unit in the second resource.

9. User equipment (UE), comprising a processor, a memory and a computer program stored in the memory and executable by the processor, wherein the processor is configured to execute the computer program to implement following step:
   determining, based on a relationship between a target time domain gap and a first preset value, to perform one of the following:
   sending a random access channel; sending an uplink data channel; sending a random access channel and an uplink data channel; or skipping sending a random access channel and an uplink data channel, wherein
   the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

10. The UE according to claim 9, wherein the processor is further configured to execute the computer program to implement following step:
    sending the random access channel and the uplink data channel in a case that the target time domain gap is greater than or equal to the first preset value.

11. The UE according to claim 9, wherein the processor is further configured to execute the computer program to implement following step: performing any one of the following in a case that the target time domain gap is less than the first preset value:
    sending the random access channel;
    sending the uplink data channel;
    skipping sending the random access channel and the uplink data channel; or
    sending the random access channel and the uplink data channel; wherein a first time domain unit in the second resource does not carry an uplink payload, or transmit power for the random access channel is the same as that for the uplink data channel.

12. The UE according to claim 11, wherein the first time domain unit in the second resource does not carry the uplink payload; and the processor is further configured to execute the computer program to implement following step: sending the random access channel by using first transmit power, and sending the uplink data channel by using second transmit power.

13. The UE according to claim 11, wherein the transmit power for the random access channel is the same as that for the uplink data channel; and the processor is further configured to execute the computer program to implement following step: sending the random access channel by using third transmit power, and sending the uplink data channel by using the third transmit power, wherein the third transmit power is the transmit power for the random access channel or the transmit power for the uplink data channel.

14. The UE according to claim 11, wherein the first time domain unit is X time domain units starting from a first time domain location in the second resource, a value of X is predefined or configured by a network device, and the first time domain location is a start location of the second resource.

15. The UE according to claim 11, wherein the first time domain unit carries a cyclic prefix (CP) for a second time domain unit, and the second time domain unit is located in a time domain unit next to the first time domain unit in the second resource.

16. A non-transitory computer-readable storage medium, wherein the non-transitory computer-readable storage medium stores a computer program, and when the computer program is executed by a processor, following step is implemented:

determining, based on a relationship between a target time domain gap and a first preset value, to perform one of the following:

sending a random access channel; sending an uplink data channel; sending a random access channel and an uplink data channel; or skipping sending a random access channel and an uplink data channel, wherein the target time domain gap is a gap between a time domain location of a first resource and a time domain location of a second resource, the first resource is a resource for the random access channel, the second resource is a resource for the uplink data channel, and the random access channel and the uplink data channel are used to carry a random access message.

17. The non-transitory computer-readable storage medium according to claim 16, wherein when the computer program is executed by a processor, following step is implemented:

sending the random access channel and the uplink data channel in a case that the target time domain gap is greater than or equal to the first preset value.

18. The non-transitory computer-readable storage medium according to claim 16, wherein when the computer program is executed by a processor, following step is implemented:

performing any one of the following in a case that the target time domain gap is less than the first preset value:

sending the random access channel;

sending the uplink data channel;

skipping sending the random access channel and the uplink data channel; or sending the random access channel and the uplink data channel; wherein a first time domain unit in the second resource does not carry an uplink payload, or transmit power for the random access channel is the same as that for the uplink data channel.

19. The non-transitory computer-readable storage medium according to claim 18, wherein the first time domain unit is X time domain units starting from a first time domain location in the second resource, a value of X is predefined or configured by a network device, and the first time domain location is a start location of the second resource.

20. The non-transitory computer-readable storage medium according to claim 18, wherein the first time domain unit carries a cyclic prefix (CP) for a second time domain unit, and the second time domain unit is located in a time domain unit next to the first time domain unit in the second resource.

* * * * *